United States Patent [19]

Lee et al.

[11] Patent Number: 5,002,460

[45] Date of Patent: Mar. 26, 1991

[54] INTERNALLY COOLED AIRFOIL BLADE

[75] Inventors: Ching-Pang Lee; Robert O. Brooks, both of Cincinnati, Ohio

[73] Assignee: General Electric Company, Cincinnati, Ohio

[21] Appl. No.: 415,756

[22] Filed: Oct. 2, 1989

[51] Int. Cl.$^5$ .............................. B63H 1/14; F01D 5/14
[52] U.S. Cl. .................................. 416/96 A; 415/115; 415/116
[58] Field of Search .............. 416/96 R, 97 R, 96 A; 415/115, 116

[56] References Cited

U.S. PATENT DOCUMENTS

| | | | |
|---|---|---|---|
| 2,779,565 | 1/1957 | Bruckmann | 416/96 A |
| 2,843,354 | 7/1958 | Smith | 416/92 |
| 2,888,243 | 5/1959 | Pollock | 416/92 |
| 2,956,773 | 10/1960 | French | 416/90 R |
| 3,044,745 | 7/1962 | Stark | 416/92 |
| 3,533,712 | 10/1970 | Kercher | 416/92 |
| 3,819,295 | 6/1974 | Hauser et al. | 416/97 |
| 3,902,820 | 9/1975 | Amos | 416/96 A |
| 4,252,501 | 2/1981 | Peill | 416/96 A |
| 4,314,007 | 2/1982 | Gessinger | 416/96 R |
| 4,474,532 | 10/1984 | Pazder | 416/97 R |
| 4,515,526 | 5/1985 | Levengood | 416/96 R |
| 4,604,031 | 8/1986 | Moss et al. | 416/97 |
| 4,616,976 | 10/1986 | Lings et al. | 416/97 R |
| 4,627,480 | 12/1986 | Lee | 164/369 |
| 4,684,322 | 8/1987 | Clifford et al. | 416/95 |
| 4,786,233 | 11/1988 | Shizuya et al. | 416/96 R |

OTHER PUBLICATIONS

ASME Paper No. 62-WA-176, "Friction and Forced Convection Heat-Transfer Characteristics in Tubes With Twisted Tape Swirl Generators", by E. Smithberg and F. Landis, 1962, pp. 1-10.

Primary Examiner—John T. Kwon
Assistant Examiner—Hoang Nguyen
Attorney, Agent, or Firm—Douglas E. Erickson; Jerome C. Squillaro

[57] ABSTRACT

An airfoil blade includes an airfoil body with a coolant passageway having a centerline which is generally straight and generally parallel to the longitudinal axis of the airfoil body for directing coolant flow in a generally longitudinal direction. An insert is placed within the coolant passageway for imparting rotation to the longitudinal directed coolant flow such that the longitudinal directed coolant flow rotates at least one complete turn about a spin axis which is generally parallel to the centerline of the coolant passageway. In another embodiment of this invention, the passageway is twisted along its length to rotate the longitudinally directed coolant flow at least one complete turn about the spin axis to increase the heat transfer coefficient.

11 Claims, 3 Drawing Sheets

INTERNALLY COOLED AIRFOIL BLADE

BACKGROUND OF THE INVENTION

The present invention relates generally to an airfoil blade for turbines, compressors, fans, and the like, and more particularly to such an airfoil blade having improved internal cooling.

Turbines have airfoil-shaped blades which are employed to extract useful work from a hot moving fluid. Jet engines include turbines which have some turbine blades attached to a rotating turbine rotor disc and some turbine blades (sometimes called vanes) attached to a non-rotating turbine stator casing. Modern aircraft jet engines have employed internal cooling of turbine blades to keep blade temperatures within design limits. Typically, such blades are cooled by air passing through internal passages, with the air entering near the blade root (the attached portion of the blade) and exiting near the blade tip (the free end portion of the blade). Known turbine blade cooling passages having a serpentine or helical shape improve cooling effectiveness by increasing the length of the coolant flow path beyond the path length for straight-line flow. A serpentine-shaped passage produces serpentine flow and has a serpentine-shaped centerline running within and down the middle of the passage, while a helical-shaped passage produces helical flow and has a helical-shaped centerline running within and down the middle of the passage. On the one hand, there is a thermal stress problem with a blade having a serpentine passage because the coolant continuously picks up heat as it travels up and down the blade which creates a non-uniform temperature across the blade from its leading edge to its trailing edge. On the other hand, a blade having a helical passage over-cools the unused central area about which the helical passage spirals, again leading to a non-uniform temperature across the blade.

SUMMARY OF THE INVENTION

It is an object of the invention to provide an airfoil blade having improved internal cooling.

It is an added object of the invention to provide such an airfoil blade having an extended coolant flow path.

It is another object of the invention to provide such an airfoil blade which achieves a more uniform cross section blade temperature.

On one embodiment of the invention, the airfoil blade includes an airfoil body with a coolant passageway having a centerline which is generally straight and generally parallel to the longitudinal axis of the airfoil body for directing coolant flow in a generally longitudinal direction. The airfoil blade also includes an insert placed within the coolant passageway for imparting rotation to the longitudinally directed coolant flow such that the longitudinally directed coolant flow rotates at least one complete turn about a spin axis which is generally parallel to the centerline of the coolant passageway. Thus, the coolant flow follows a helical path in a passageway having a straight centerline. In another embodiment of the invention, the airfoil blade includes an airfoil body with a coolant passageway having a centerline which is generally straight and generally parallel to the longitudinal axis of the airfoil body for directing coolant flow in a generally longitudinal direction. In this embodiment, the coolant passageway has a non-circular cross section, and the coolant passageway is twisted along its length at least one complete turn about a spin axis which is generally parallel to the centerline of the coolant passageway. The effect of the twisted passageway is to rotate the longitudinally directed coolant flow at least one complete turn about the spin axis. Thus, in this embodiment, the coolant flow also follows a helical path in a passageway having a straight centerline.

Several benefits and advantages are derived from the invention which provides an airfoil blade having helical flow within a coolant passageway having a straight centerline. The helical coolant flow path is longer than if the coolant flow followed a straightline path in the passageway. The extended flow trajectory increases the heat transfer area, while the helical motion of the flow scrubs the wall of the passageway which increases the heat transfer coefficient. The straight centerline of the passageway allows the blade to achieve a more uniform temperature across the blade because it avoids the non-uniform temperature problem across the blade caused by either the up and down flow in a serpentine passageway or the over-cooling of the unused central area about which a helical passageway spirals.

BRIEF DESCRIPTION OF THE DRAWINGS

By way of illustration, but not of limitation, the accompanying drawings illustrate various preferred embodiments of the present invention wherein.

DETAILED DESCRIPTION OF THE INVENTION

Figure 1:
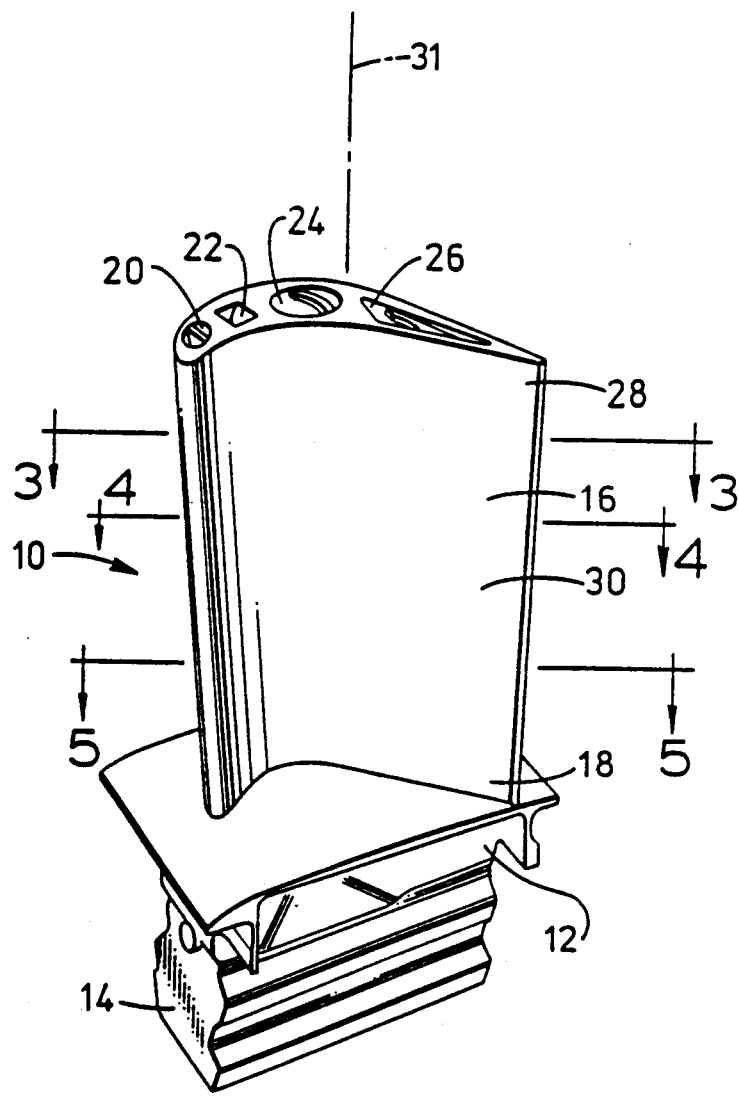
FIG. 1 is a perspective view of a jet engine turbine blade which incorporates the invention.
Figure 2:
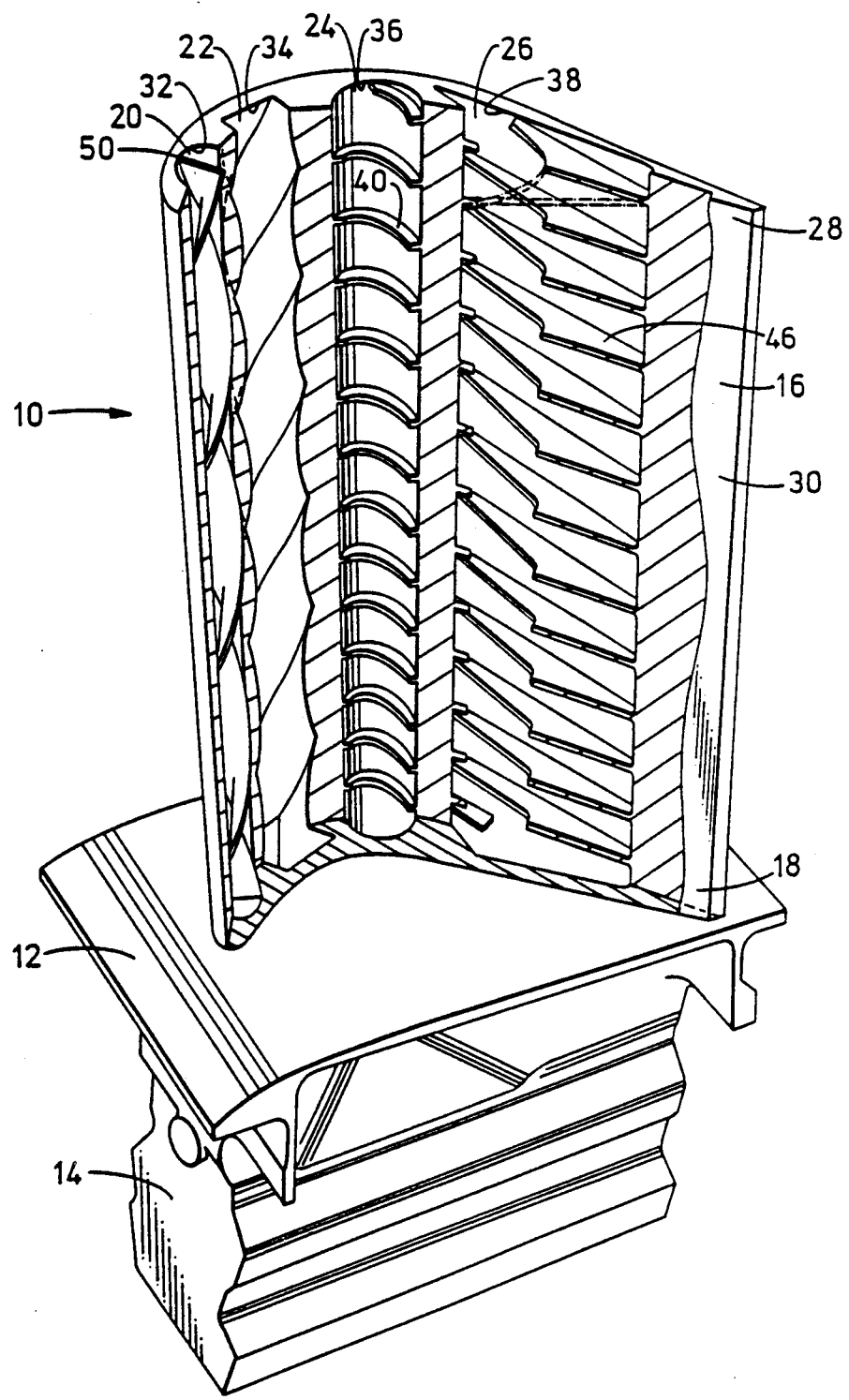
FIG. 2 is a partial cut-away view of the turbine blade of FIG. 1 revealing the four coolant passageways of the airfoil blade which impart rotation to longitudinally directed coolant flow.
Figure 3:
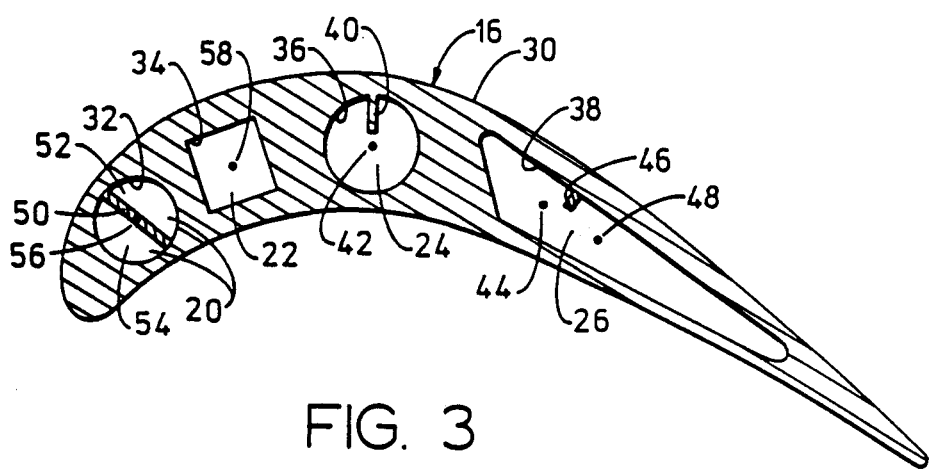
FIGS. 3, 4, and 5 are planar cross-sectional views, omitting background structure for clarity, of the airfoil blade of FIG. 1, at successive longitudinal distances between the airfoil blade tip and root, showing: the twisting of a partition in the left-most passageway, the twisting of a square passageway, the rotation of a helical fin in a circular passageway, and the rotation of a fin in the arbitrarily-shaped right-most passageway.
Figure 4:
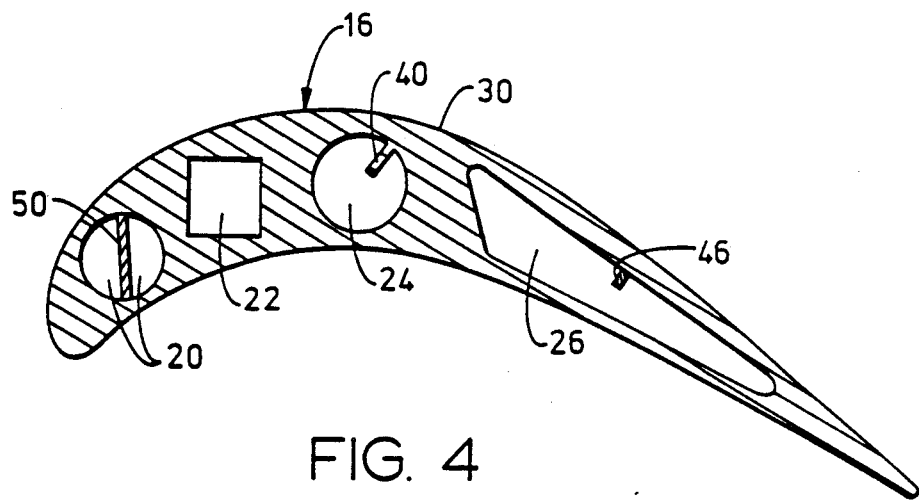
Figure 5:
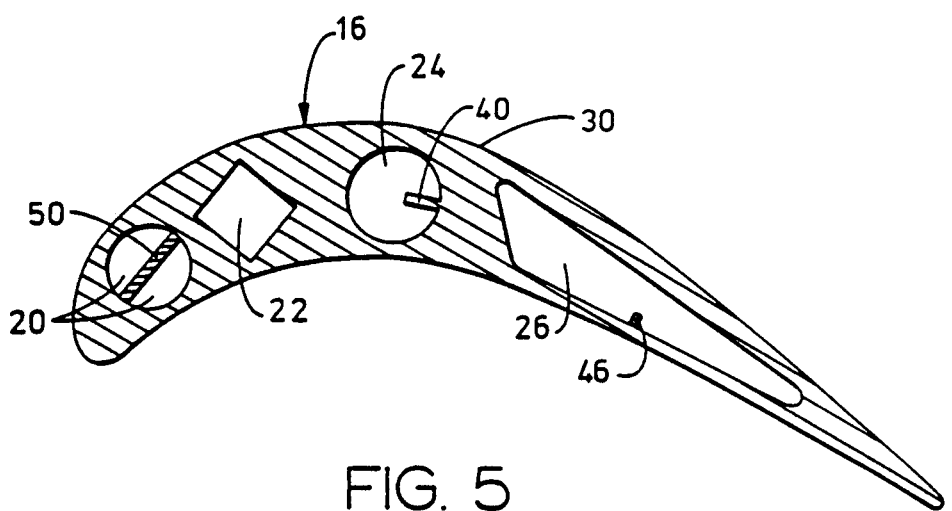

An aircraft jet engine turbine blade 10, shown in FIG. 1, includes a shank portion 12 with a dovetail 14 for attachment to a turbine rotor disc (not shown) and an airfoil blade portion 16 whose root 18 is attached to the shank portion 12. Cooling air enters the shank portion 12 and then flows through internal coolant passageways 20, 22, 24, and 26 in the airfoil blade 16 exiting from its tip 28. The airfoil blade 16 has an airfoil body 30 which includes, as seen in FIGS. 2 and 3, four inner wall surfaces 32, 34, 36, and 38 each defining one of four coolant passageways 20, 22, 24, and 26 having a centerline 56, 58, 42, and 48 (shown on end in FIG. 3 as a point) running within and down the middle of each passageway. Each centerline is generally straight and generally parallel to the longitudinal axis 31 of the airfoil body 30 for directing coolant flow in a generally longitudinal direction.

In three of the passageways 20, 24, and 26, representing a first embodiment of the invention, the airfoil blade also includes means disposed within the passageway for imparting rotation to the longitudinally directed coolant flow such that the longitudinally directed coolant flow rotates at least one complete turn about a spin axis which is generally parallel to the centerline of the coolant passageway. Preferably, such means include helical fins, twisted passageway partitions, passageway projections, and the like, secured within the passageway by attachment to the inner wall surface or by attachment outside the passageway such as to the blade root and/or tip.

In the case of first passageway 24, the flow rotation means include a helical fin 40 attached to inner wall surface 36. Helical fin 40 has a central axis which generally coincides with the spin axis, and the spin axis generally coincides with centerline 42 of the coolant passageway. First passageway 24 has a generally circular cross section, and helical fin 40 has a shape which is generally the same as the shape of threads in a nut.

An airfoil blade having first passageway 24 can be manufactured, for example, by casting a metallic airfoil body about a ceramic casting core having the shape of a threaded bolt, the casting core being later chemically removed from the cast airfoil body. Second passageway 26 also has a helical fin 46, but the spin axis 44 (shown on end in FIG. 3 as a point) is offset from centerline 48 of the coolant passageway.

For third passageway 20, the flow rotation means include a partition 50 attached to the inner wall surface 32 so as to divide the passageway into two generally equal subpassages 52 and 54. The partition has a lengthwise axis which generally coincides with the spin axis, and the spin axis generally coincides with the centerline 56 of the coolant passageway. Third passageway 20 has a generally circular cross section, and partition 50 is twisted along its length about the spin axis.

An airfoil blade having third passageway 20 can be manufactured, for example, as follows. An airfoil body having a circular coolant passageway is obtained. Likewise, a partition insert is obtained which is disposable in the passageway to divide the passageway into two generally equal subpassages. The partition insert is heated to a temperature at which it is malleable, and the heated insert is then twisted at least one complete turn about its lengthwise axis. Next, the twisted insert 50 is disposed in the passageway 20, and then the disposed insert is secured within the passageway. The securing may be accomplished, for example, by metallurgically attaching the insert to the passageway inner wall.

Fourth passageway 22 is incorporated in a second embodiment of the invention wherein the coolant passageway has a non-circular, and preferably square, cross section. Coolant passageway 22 is twisted along its length at least one complete turn about a spin axis which is generally parallel to, and which preferably coincides with, centerline 58 of the coolant passageway.

An airfoil blade having fourth passageway 22 can be manufactured, for example, as follows. A quartz-rod casting core having a non-circular cylindrical shape (such as a square column) is obtained. The casting core is heated to a temperature at which it is malleable, and the heated casting core is then twisted at least one complete turn about its lengthwise axis. Next, a metallic airfoil body is cast about the twisted casting core, and then the casting core is chemically removed from the case airfoil body.

The invention provides an improved internally cooled airfoil blade, one which achieves advantageous helical flow in Passageways having preferred straight centerlines. It is understood that the airfoil blade of the invention may be incorporated into, among other things, a rotating or stationary turbine, compressor or fan blade, vane, or stator, having diverse applications including, but not limited to, aircraft jet engines, and that the coolant may be a gas and/or liquid. It is also understood that the airfoil blade of the invention may contain any number, any combination, any cross-sectional configuration, etc. of the above-described passageways.

The foregoing description of preferred embodiments of the invention has been presented for purposes of illustration. It is not intended to be exhaustive or to limit the invention to the precise form disclosed, and obviously many modifications and variations are possible in light of the above teachings all of which are within the scope of the claims appended hereto.

We claim:

1. An airfoil blade comprising:
   (a) an airfoil body having a longitudinal axis and a coolant passageway, said coolant passageway having a centerline which is generally straight and generally parallel to said longitudinal axis of said airfoil body for directing coolant flow in a generally longitudinal direction with said coolant passageway; and
   (b) means disposed within said coolant passageway for imparting rotation to said longitudinally directed coolant flow such that the entire said longitudinally directed coolant flow rotates at least one complete turn within said coolant passageway about a spin axis which is generally parallel to said centerline of said coolant passageway.

2. The airfoil blade of claim 1, wherein said means include a helical fin having a central axis which generally coincides with said spin axis.

3. The airfoil blade of claim 2, wherein said spin axis generally coincides with said centerline of said coolant passageway.

4. The airfoil blade of claim 3, wherein said coolant passageway has a generally circular cross section.

5. The airfoil blade of claim 4, wherein said helical fin has a shape which is generally the same as the shape of threads in a nut.

6. The airfoil blade of claim 1, wherein said means include a partition dividing said coolant passageway into two subpassages, said partition having a lengthwise axis which generally coincides with said spin axis, said partition being twisted along its length about said spin axis.

7. The airfoil blade of claim 6, wherein said spin axis generally coincides with said centerline of said coolant passageway.

8. The airfoil blade of claim 7, wherein said coolant passageway has a generally circular cross section.

9. An airfoil blade comprising an airfoil body having a longitudinal axis and a coolant passageway, wherein said coolant passageway has a centerline which is generally straight and generally parallel to said longitudinal axis of said airfoil body for directing coolant flow in a generally longitudinal direction within said coolant passageway, said coolant passageway has a non-circular cross section, and said coolant passageway is longitudinally twisted along its length at least one complete turn about a spin axis which is generally parallel to said centerline of said coolant passageway such that said longitudinally directed coolant flow rotates within said coolant passageway about said spin axis.

10. The airfoil blade of claim 9, wherein said spin axis generally coincides with said centerline of said coolant passageway.

11. The airfoil blade of claim 10, wherein said coolant passageway has a generally square cross section.

* * * * *